United States Patent
Dukes et al.

(10) Patent No.: US 9,564,971 B2
(45) Date of Patent: Feb. 7, 2017

(54) DEVICES AND METHODS FOR MODULAR OPTICAL CABLING SYSTEMS

(71) Applicant: Lastar, Inc., West Hartford, CT (US)

(72) Inventors: Garry Dukes, West Hartford, CT (US); Xiaolin Tong, Irvine, CA (US); Everett Poffenberger, West Hartford, CT (US); Junxing Cao, Kunshan Jiangsu (CN); Xin Yang, Kunshan Jiangsu (CN)

(73) Assignee: Lastar, Inc., West Hartford, CT (US)

( * ) Notice: Subject to any disclaimer, the term of this patent is extended or adjusted under 35 U.S.C. 154(b) by 174 days.

(21) Appl. No.: 14/485,344

(22) Filed: Sep. 12, 2014

(65) Prior Publication Data

US 2016/0080081 A1    Mar. 17, 2016

(51) Int. Cl.
| | |
|---|---|
| *H04B 10/00* | (2013.01) |
| *H04B 10/25* | (2013.01) |
| *G02B 6/42* | (2006.01) |
| *H04B 10/60* | (2013.01) |
| *H04B 10/50* | (2013.01) |

(52) U.S. Cl.
CPC ......... *H04B 10/2504* (2013.01); *G02B 6/4284* (2013.01); *H04B 10/501* (2013.01); *H04B 10/60* (2013.01); *G02B 6/4281* (2013.01)

(58) Field of Classification Search
CPC ..................... H04B 10/25753; H04B 10/1125; H04B 10/11; H04B 10/60; H04B 10/501; H04W 88/085; G02B 6/4292; G02B 6/3817; G02B 6/4284; G02B 6/4448; G02B 6/4281
USPC .................................. 398/116, 164; 385/100
IPC ......................................................... G02B 6/42
See application file for complete search history.

(56) References Cited

U.S. PATENT DOCUMENTS

| | | | |
|---|---|---|---|
| 2007/0010132 A1 | 1/2007 | Nelson et al. | |
| 2007/0237464 A1* | 10/2007 | Aronson .............. | G02B 6/4292 385/89 |
| 2012/0249871 A1 | 10/2012 | Nguyen et al. | |
| 2013/0183045 A1* | 7/2013 | Niiho .................... | H04B 10/25 398/142 |
| 2013/0195396 A1 | 8/2013 | Julien et al. | |
| 2013/0236188 A1* | 9/2013 | Hung .................... | H04B 10/25 398/116 |
| 2014/0044399 A1* | 2/2014 | Schmidt ............... | G02B 6/4201 385/134 |
| 2015/0063369 A1* | 3/2015 | Lida .................... | H04L 12/2832 370/419 |

OTHER PUBLICATIONS

International Search Report dated Jan. 11, 2016 from PCT Application PCT/US2015/049996.

\* cited by examiner

*Primary Examiner* — Tesfaldet Bocure
(74) *Attorney, Agent, or Firm* — K. David Crockett, Esq.; Paul J. Backofen, Esq.; Crockett & Crockett, PC

(57) ABSTRACT

A modular optical cabling system converts and transmits digital electronic signals from a source such as a computer to any suitable target device such as a display or a projector through an optical backbone. A modular transmitting unit connects the source to a modular optical cable and converts the digital electrical signals to optical signals. A modular receiving unit receiver connects the modular optical cable to the target device and converts the optical signals to digital electrical signals. A directional modular optical cable connects between the transmitter unit and the receiver unit.

20 Claims, 4 Drawing Sheets

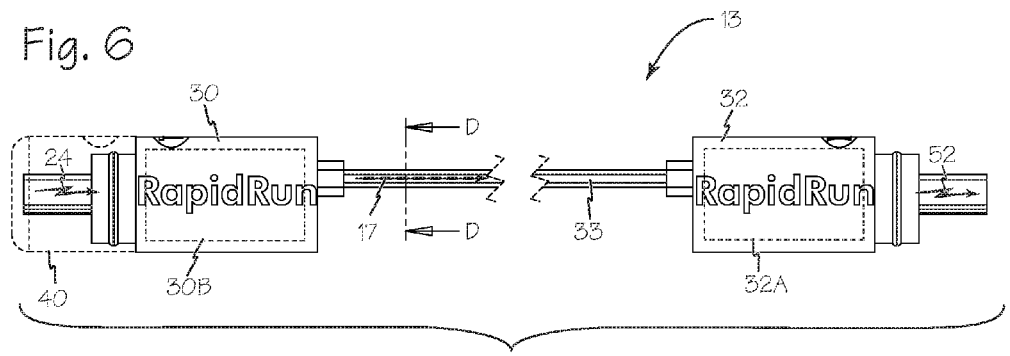
Fig. 6
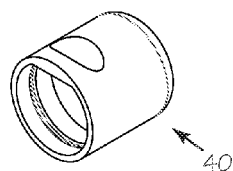
Fig. 7
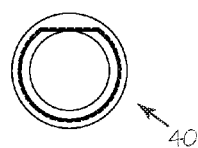
Fig. 8
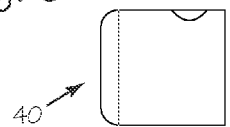
Fig. 9
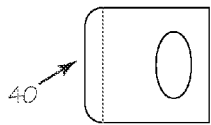
Fig. 10
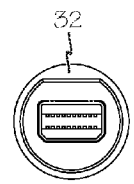
Fig. 11
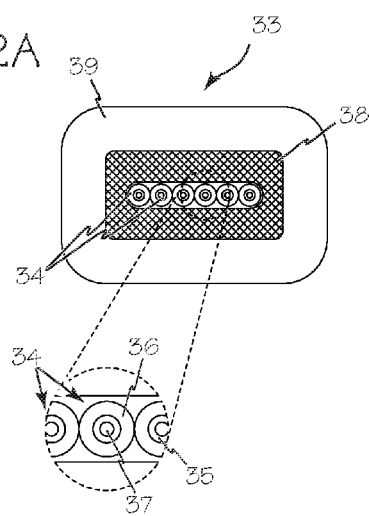
Fig. 12A
Fig. 12B

DEVICES AND METHODS FOR MODULAR OPTICAL CABLING SYSTEMS

FIELD OF THE INVENTIONS

The inventions described below relate to the field of closed system data communications and more specifically to modular optical data systems.

BACKGROUND

Both wired and wireless data communication systems suffer limitations. Wired systems have bandwidth restrictions and suffer interference due to the copper wiring. Adding wires and or extra shielding adds cost and complexity to the systems. Wireless systems generally have power limitations and suffer from the same or similar bandwidth and interference problems.

SUMMARY

The devices and methods described below provide for a modular optical cabling system that converts and transmits digital electronic signals from a source device such as a computer to one or more target devices such as a display or a projector through an optical backbone. A modular transmitting unit connects the source to a modular optical cable and converts the digital electrical signals to optical signals. A modular receiving unit receiver connects the modular optical cable to the target device and converts the optical signals to digital electrical signals. A directional modular optical cable connects between the transmitter unit and the receiver unit.

The transmitter unit has one or more flexible printed circuit boards interposed between a native connector, such as High-Definition Multimedia Interface (HDMI) connector, and a mini display port (DP) connector. The native connector is operatively connected to the source device and may be any suitable connector that includes power for energizing the circuitry in the transmitter unit. The printed circuit boards provide a smaller bend radius than copper wiring and also provide improved impedance for maintaining high-speed signal integrity. The circuitry for converting the electrical signals to optical signals is contained in the mini-DP connectors.

There may be one or more cables, connectors and or adapters interposed between the transmitter unit and a source device, or between the receiver unit and the target device. These interposed units simply conduct the digital electrical signals to and from the transmitter and receiver units and any suitable source and target devices.

BRIEF DESCRIPTION OF THE DRAWINGS

FIG. 6 is a top view of an optical cable.

FIG. 7 is a perspective view of a connector cover for the Mini-DP connectors of the cable of FIG. 6.

FIG. 8 is an end view of the connector cover of FIG. 7.

FIG. 9 is a side view of the connector cover of FIG. 7.

FIG. 10 is an alternate view of the connector cover of FIG. 7.

FIG. 11 is an end view of the Mini-DP connector of the cable of FIG. 6.

FIG. 12A is a cross section view of the optical cable of FIG. 6 taken along D-D.

FIG. 12B is a close-up view of a portion of the optical cable cross section of FIG. 12A.

DETAILED DESCRIPTION

Figure 1:
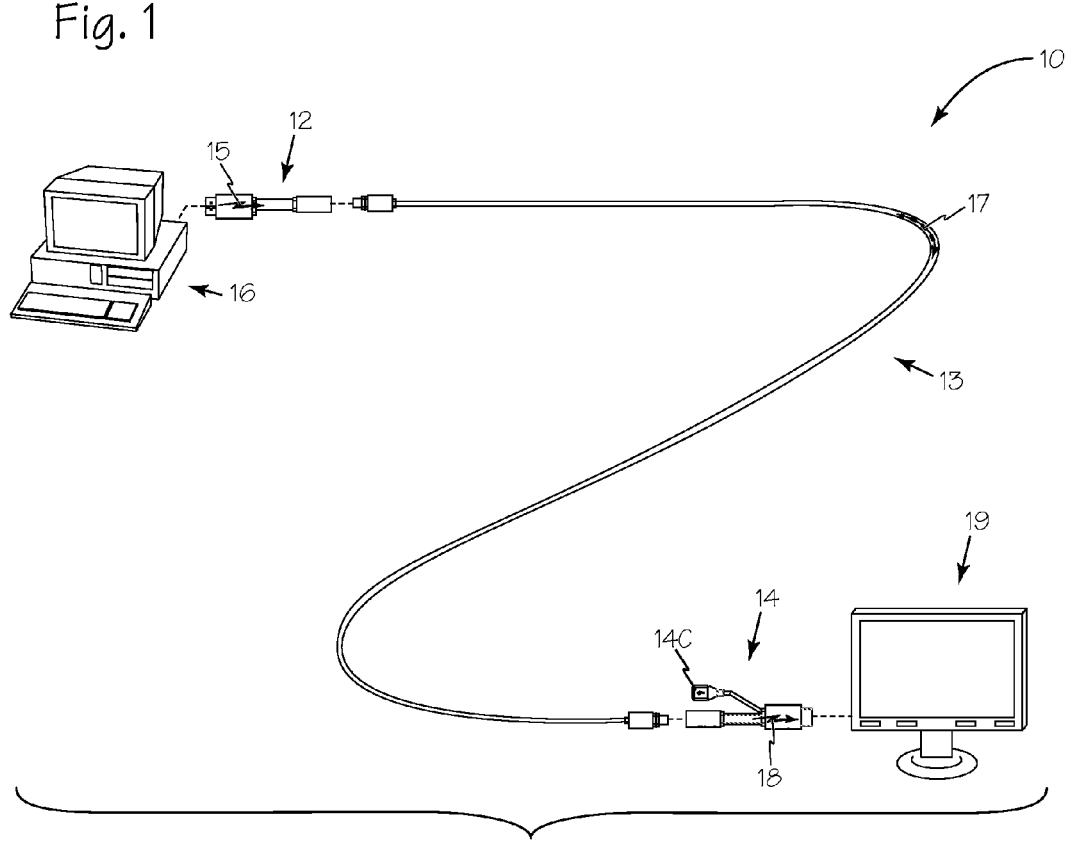
FIG. 1 is an exploded view of a modular optical cabling system.
Figure 2:
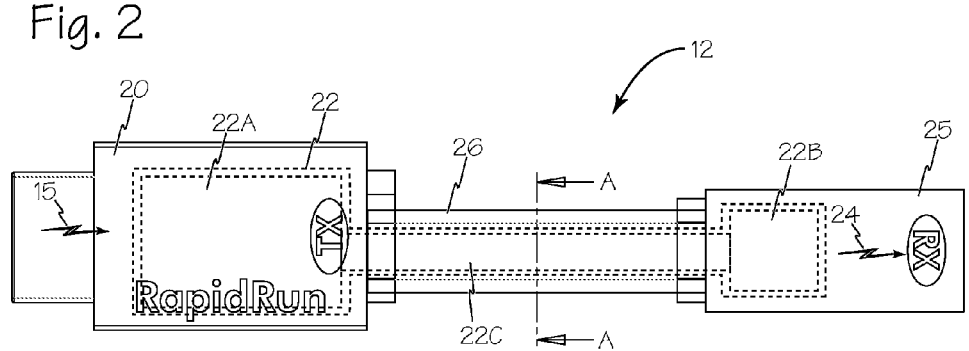
FIG. 2 is a top view of a transmitting unit.
Figure 3:
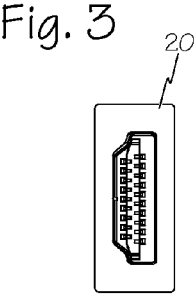
FIG. 3 is an end view of the native connector of the transmitting unit of FIG. 2.
Figure 4:
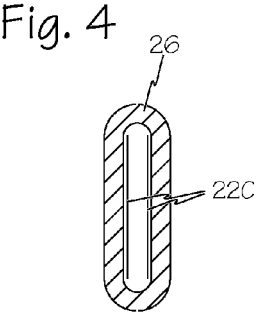
FIG. 4 is a cross section view of the transmitting unit of FIG. 2 taken along A-A.
Figure 5:
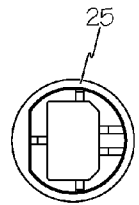
FIG. 5 is an end view of the mini-DP connector of the transmitting unit of FIG. 2.

Modular optical system 10 of FIG. 1 includes a transmitter unit 12, an optical cable 13 and a receiver unit 14. Transmitter unit 12, converts digital electrical signals, transmitter signals 15, from any suitable source device such as computer 16 to optical signals 17 conducted by optical cable 13. Optical signals 17 conducted by the optical cable are reconverted to electrical signals, receiver signals 18 in receiver unit 14 which is connected to any suitable target device such as display 19. Power for the circuitry in receiver unit 14 is provided through USB connector 14C. Any suitable cables, connectors and or converters may be interposed between source device 16 and transmitter unit 12 to operatively connect the source device with the transmitter unit and convey digital transmitter electrical signals 15 to the transmitter unit. Any suitable cables, connectors and or converters may be interposed between receiver unit 14 and target device 19 to operatively connect the receiver unit with the target device and convey digital receiver electrical signals 18 to the target device.

Referring now to FIGS. 2, 3, 4 and 5, transmitter unit 12 includes any suitable native connector to connect to a computer such as native connector 20 which conducts electrical power and digital electrical signal 15 from the source, computer 16, to intermediate circuit 22 which converts electrical signal 15 to intermediate electrical signal 24. Intermediate electrical signal 24 is conveyed to transmitter connector 25 for transmission to optical cable 13. Native connector 20 and circuits 22A are connected to transmitter connector 25 and circuits 22B by flying lead cable 26 which includes one or more flexible printed circuit boards such as flexible printed circuit boards 22C.

Figure 13:
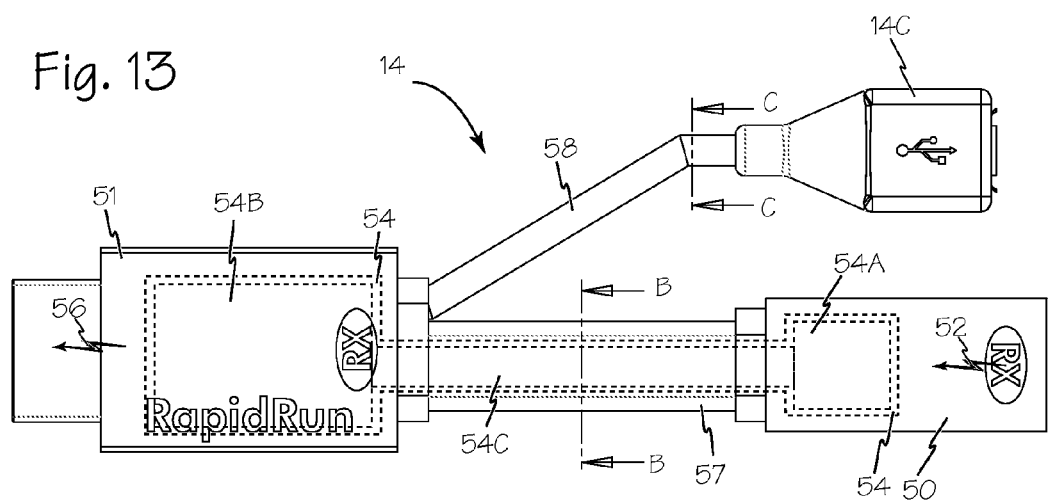
FIG. 13 is a top view of a receiving unit.
Figure 14:
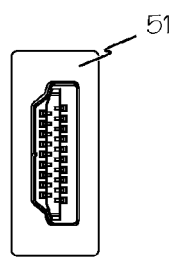
FIG. 14 is an end view of the native connector of the receiving unit of FIG. 13.
Figure 15:
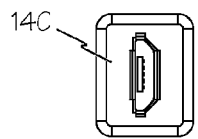
FIG. 15 is an end view of the USB connector of the receiving unit of FIG. 13.
Figure 16:
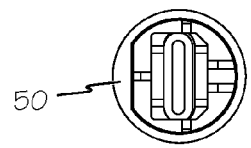
FIG. 16 is an end view of the Mini-DP connector of the receiving unit of FIG. 13.
Figure 17:
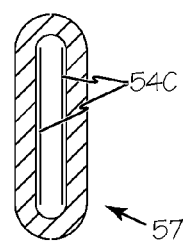
FIG. 17 is a cross section view of the receiving unit of FIG. 13 taken along B-B.
Figure 18:
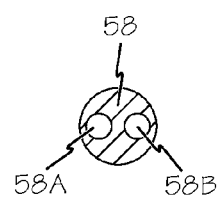
FIG. 18 is a cross section view of the receiving unit of FIG. 13 taken along C-C.

Optical cable 13 is illustrated in FIGS. 6 and 11. Cable 13 includes a transmitter connector 30 and a receiver connector 32 operatively connected together by any suitable length of optical cable 33. Transmitter connector 30 engages transmitter connector 25 and receiver connector 32 engages receiver connector 50 of receiver unit 14 which is illustrated in FIG. 13. Electric circuit 30B in second transmitter connector 30 converts intermediate electric signals 24 to optical signals 17. Electric circuit 32A in receiver connector 32 converts optical signals 17 to intermediate electric signals 52. Transmitter connectors 25 and 30 and receiver connectors 32 and 50 are mini display port connectors however, they are not wired as mini display port connectors and may not be connected to any conventional mini display port. Transmitter connector 25 is not interchangeable with receiver connector 32 thus, modular optical cable 13 is directional.

Referring now to FIGS. 12A and 12B, optical cable 33 contains six optical fiber assemblies 34, each optical fiber assembly fiber has a cladding layer 35 and a buffer layer 36 enclosing the optical fiber 37. The six fiber assemblies 34 are surrounded by a strength layer 38 and a sealing layer 39. Strength layer 38 may be formed of any suitable material such as KEVLAR® and sealing layer 39 may be formed of any protective material such as polyvinylchloride (PVC).

First transmitter connector 25 and second receiver connector are non-standard female gendered mini display port connectors. Second transmitter connector 30 and first receiver connector 50 are non-standard male gendered mini display connectors. Transmitter connectors 25 and 30 and receiver connectors 32 and 50 are covered by a removable sealing cap such as cap 40, illustrated in FIGS. 6, 7, 8, 9 and 10, when the connectors are connected together.

Receiver unit 14 is illustrated in FIGS. 13, 14, 15, 16, 17 and 18. Receiver unit 14 includes power connector 14C, second receiver connector 50 and native connector 51. Second receiver connector 50 engages first receiver connector 32 to conduct second intermediate electrical signals 52 to intermediate circuit 54 which converts intermediate electrical signal 52 to output electrical signals 56. Output electrical signals 56 are conveyed through native connector 51 to any suitable target device such as display 19. Native connector 51 and circuits 54A are connected to receiver connector 50 and circuits 54B by flying lead cable 57 which includes one or more flexible printed circuit boards such as flexible printed circuit boards 54C.

Electrical power for intermediate conversion circuits 54 and for electric circuit 32A is available from any suitable device operatively connected to power connector 14C. The electrical power is conducted to circuits 54 through power cable 58 which includes at least two power conductors such as first power conductor 58A and second power conductor 58B.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A modular system for conveying digital information from a source device to a target device comprising:
   a transmitter unit having a native connector and a first transmitter connector, the native connector is operatively connected to the source device, the transmitter unit further including one or more electronic circuits for converting source digital electronic signals from the source device to first intermediate electronic signals which are conveyed to the first transmitter connector;
   an optical cable having a second transmitter connector and a first receiver connector operably connected together by six optical fiber assemblies, the first transmitter connector and the second transmitter connector engage each other and contain one or more electronic circuits to convert the first intermediate electronic signals to digital optical signals, the first receiver connector contains one or more electronic circuits to convert the digital optical signals to second intermediate electronic signals;
   a receiver unit operatively connected to the optical cable first receiver connector, the receiver unit including one or more electronic circuits for converting the second intermediate electronic signals to target digital electronic signals which are conveyed to a native connector which is operatively connected to the target device to convey the digital electronic signals to the target device.

2. The modular system of claim 1 wherein the receiver unit further comprises:
   a USB connector and cable operatively connected between a power source and the receiver unit to convey electrical power to the one or more electrical circuits of the receiver unit and the one or more electrical circuits of the receiver connectors.

3. The modular system of claim 1 wherein the target digital electronic signals correspond to the source digital electronic signals.

4. The modular system of claim 1 wherein the optical cable is directional and the second transmitter connector and the first receiver connector are not interchangeable.

5. The modular system of claim 1 wherein the transmitter unit further comprises one or more flexible printed circuit boards connected between the native connector and the first transmitter connector.

6. The modular system of claim 1 wherein the receiver unit further comprises one or more flexible printed circuit boards connected between the first receiver connector and the native connector.

7. The modular system of claim 1 wherein the first transmitter connector and the second receiver connector are male gendered connectors.

8. The modular system of claim 1 wherein the native connectors are high definition multimedia interface connectors.

9. The modular system of claim 1 wherein the first and second transmitter connectors and the first and second receiver connectors are mini display port connectors.

10. The modular system of claim 1 wherein the native connectors are high definition multimedia interface connectors.

11. The modular system of claim 1 wherein the first and second transmitter connectors and the first and second receiver connectors are mini display port connectors.

12. A method for optically conveying digital information comprising:
    providing source device for producing source digital electronic signals;
    providing a transmitter unit having a native connector and a first transmitter connector, the native connector is operatively connected to the source device, the transmitter unit further including one or more electronic circuits for converting source digital electronic signals from the source device to first intermediate electronic signals which are conveyed to the first transmitter connector;
    providing an optical cable having a second transmitter connector and a first receiver connector operably connected together by six optical fiber assemblies, the first transmitter connector and the second transmitter connector engage each other and contain one or more electronic circuits to convert the first intermediate electronic signals to digital optical signals, the first receiver connector contains one or more electronic circuits to convert the digital optical signals to second intermediate electronic signals;

providing a target device for receiving target digital electronic signals;

providing a receiver unit operatively connected to the optical cable first receiver connector, the receiver unit including one or more electronic circuits for converting the second intermediate electronic signals to target digital electronic signals which are conveyed to a native connector which is operatively connected to the target device to convey the digital electronic signals to the target device;

generating source digital electronic signals from the source device; and receiving the target digital electronic signals in the target device.

13. The method of claim 12 wherein the target digital electronic signals correspond to the source digital electronic signals.

14. A system for conveying digital information comprising:

a source device for generating source digital electronic signals;

a first converter means for converting source digital electronic signals from the source device to first intermediate electronic signals, the first converter means having a native connector, one or more electronic circuits and a first transmitter connector, the native connector is operatively connected to the source device, the one or more electronic circuits convey the first intermediate electronic signals to the first transmitter connector;

an optical cable having a second transmitter connector and a first receiver connector, the first receiver connector and the second transmitter connector are operably connected to each other by six optical fiber assemblies and the first transmitter connector contains one or more electronic circuits to convert the first intermediate electronic signals to digital optical signals, the first receiver connector contains one or more electronic circuits to convert the digital optical signals to second intermediate electronic signals;

a second converter means for converting the second intermediate electronic signals to target digital electronic signals, the second converter means is operatively connected between the optical cable first receiver connector and the target device to convey the target digital electronic signals to the target device.

15. The system of claim 14 wherein the second converter means further comprises:

a USB connector and cable operatively connected between a power source and the second converter means to convey electrical power to one or more electrical circuits within the second converter means and one or more electrical circuits of the receiver connectors.

16. The system of claim 14 wherein the target digital electronic signals correspond to the source digital electronic signals.

17. The system of claim 14 wherein the optical cable is directional and the second transmitter connector and the first receiver connector are not interchangeable.

18. The system of claim 14 wherein the first converter means further comprises one or more flexible printed circuit boards connected between the native connector and the first transmitter connector.

19. The system of claim 14 wherein the second converter means further comprises:

a first receiver connector;

a native connector; and one or more flexible printed circuit boards connected between the first receiver connector and the native connector.

20. The system of claim 14 wherein the first transmitter connector and the second receiver connector are male gendered connectors.

* * * * *